United States Patent [19]

Findeisen

[11] 4,397,389
[45] Aug. 9, 1983

[54] TAPE CASSETTE CONTAINER

[76] Inventor: Andrew M. Findeisen, 512 Cumberland St., Westfield, N.J. 07090

[21] Appl. No.: 298,945

[22] Filed: Sep. 3, 1981

[51] Int. Cl.³ .................. B65D 85/672; B65D 21/02
[52] U.S. Cl. .................................. 206/387; 206/477; 206/482; 206/821; 220/23.6; 220/338
[58] Field of Search ............. 206/387, 477, 480, 482, 206/483, 485, 821; 220/23.4, 338, 283, 23.6, 23.83

[56] References Cited

U.S. PATENT DOCUMENTS

| | | | |
|---|---|---|---|
| 3,055,534 | 9/1962 | Boenecke | 220/338 |
| 3,599,828 | 8/1971 | Conway | 206/170 |
| 3,620,367 | 11/1971 | Stembel | 206/387 |
| 3,635,350 | 1/1972 | Wolf | 220/23.4 X |
| 3,754,639 | 8/1973 | Gellert | 206/387 |
| 3,760,937 | 9/1973 | Van Wyngarden et al. | 206/387 |
| 3,946,865 | 3/1976 | Bierwas | 206/387 |
| 4,098,402 | 7/1978 | Rogg | 206/387 |

Primary Examiner—George E. Lowrance
Assistant Examiner—Brenda J. Ehrhardt
Attorney, Agent, or Firm—Bruce M. Collins

[57] ABSTRACT

A plastic tape cassette container having a general rectangular parallelpipedal shape in its closed configuration having a lid which is pivotably mounted between two parallel side walls, detent means operable to favor retention of said container in a closed configuration, and interlocking means disposed in matching relationships on the lid and the lower face by which the lower face of one container can be interlocked with the lid of the second like container.

9 Claims, 10 Drawing Figures

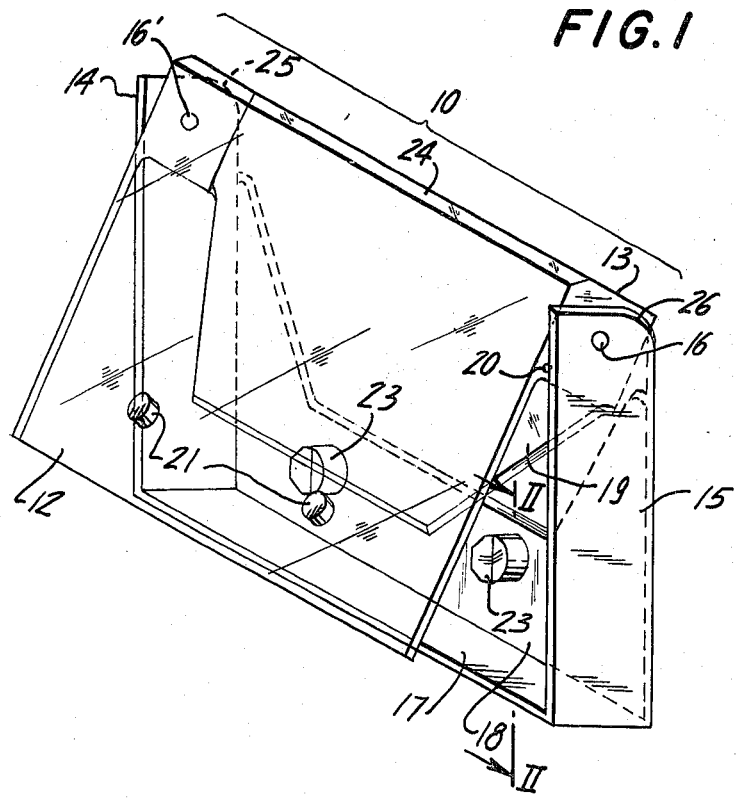
FIG. 1
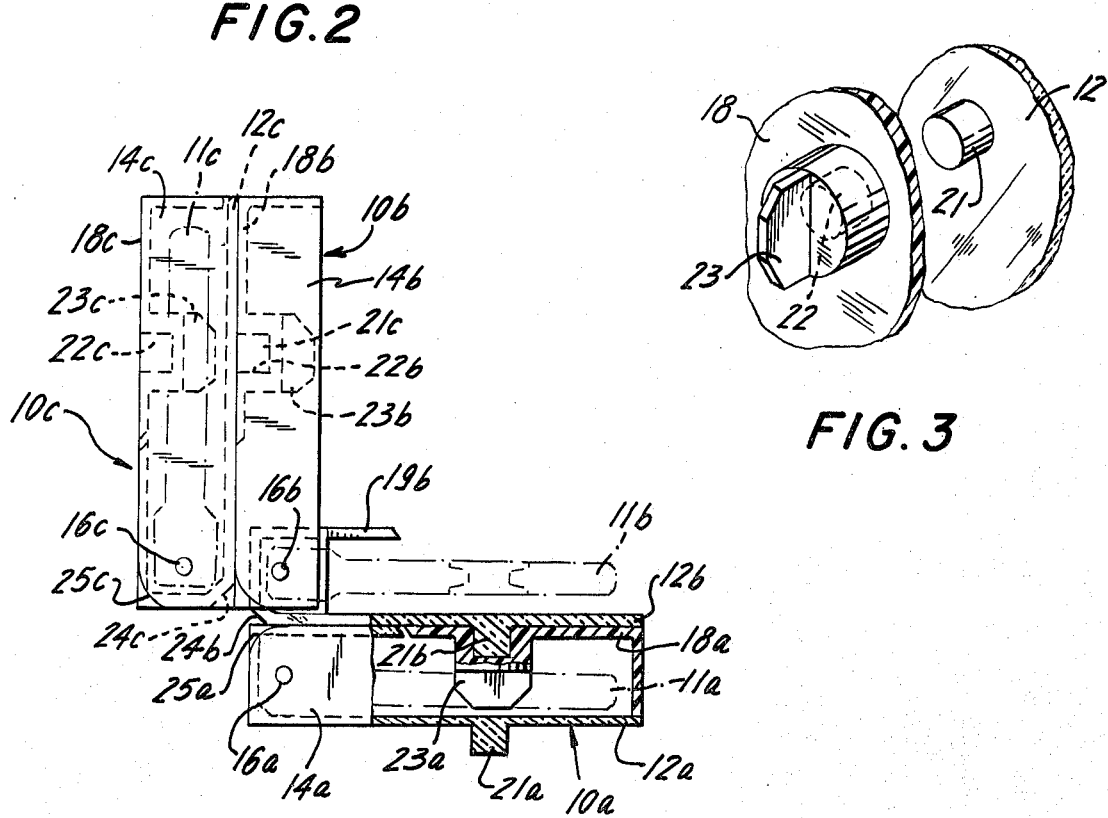
FIG. 2
FIG. 3

TAPE CASSETTE CONTAINER

The present invention pertains to plastic containers in which narrow and extra thin sound tapes are generally supplied in order to protect the tape. As is fully discussed in, for example, U.S. Pat. No. 3,946,865, difficulties are often encountered in the storage and stacking of cassette containers which are generally a plastic box having a parallelpidedal shape with smooth outer surfaces. As a result of the light weight of the cassette and its plastic box, it is not practical to stack more than a very few number of boxes or containers on top of one another, thus requiring separate and additional storage means such as racks, bins or framework. It is also difficult to transport a container unless a special cassette carrier is used to handle a number of containers.

Various cassette containers, racks and bins have been proposed for the storage and transport of cassettes including, in addition to that described in U.S. Pat. No. 3,946,865, modular systems for both cassettes and eight track tape cartridges; see e.g. U.S. Pat. Nos. 3,599,828, 3,760,937 and 4,098,402. Generally such systems utilize containers which are separate and distinct entities from the original container, namely that in which the tape is distributed and sold. Moreover, since these systems envision modular assemblies with the sides of the containers being interlocked, it is necessary to limit the container to essentially five walls, leaving one face open for access. A separate cap or cover in order to ensure substantially dust free storage must then be provided. For example, in U.S. Pat. No. 4,098,402, there is described an interlocking modular system of container in which the containers have an open top end for reception of the tape cartridges and separate closure means, the individual containers being connected by male and female connecting means. Apart from adding to the cost to the consumer for the purchase of such a container system, the separate components are suseptible to separation and misplacement.

The present invention pertains to a novel plastic container suitable for the transportation, storage and sale of a tape cassette, which container can be interlocked with one or more like containers, at the option of the owner, which does not required separate closure means, and which furthermore permits removal of any desired cassette without disturbing the particular arrangement of containers selected by the owner. Moreover, the present invention permits the removal from the system of any one (or more) containers without disturbing the remaining containers, as well as the display of individual containers, as for example for advertising and sales promotions.

These and other objects of the invention will be more readily apparent from the drawings, in which:

FIG. 1 is a perspective of one embodiment of the present invention;

FIG. 2 is a side elevation, with a portion shown in cutaway cross-section along line II—II′0 of FIG. 1, of several containers depicted in interlocking relationship, one such container being open to expose the cassette carried therein;

FIG. 3 is a detail in perspective of the interlocking means of the embodiment depicted in FIGS. 1 and 2;

Figure 4:
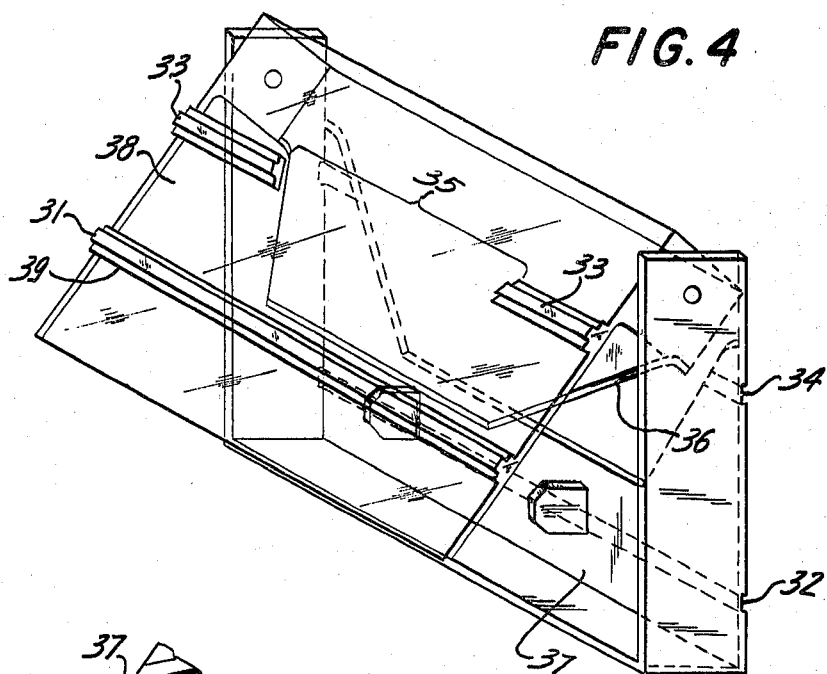
FIG. 4 is a perspective of a second embodiment of the present invention.

Referring now to the drawings in greater detail, there is shown in FIG. 1 a plastic container 10 (of which several, 10a, 10b and 10c are shown in FIG. 2). When this container is in its closed configuration, as in the case of 10a and 10c in FIG. 2, it is of general rectangular parallelpidedal shape of such dimensions as to receive a tape cassette (11a, 11b and 11c showing FIG. 2). Upper face 12 is integral with one side wall 13 so as to define a lid for the container. The lid is pivotably mounted between two remaining parallel side walls 14 and 15 by suitable shaft elements 16 and 16′. Parallel side walls 14 and 15 are integral with the remaining side wall 17 and with at least a portion of the lower face 18, the remainder of the lower face (when closed) 19 being integral with side wall 13.

Detent means are disposed on either the lid or on the corresponding interior surface of one or both of side walls 14 and 15 in order to favor retention of the container in closed configuration. Such detent means can be of any of the well-known structures utilized in the plastic container art such as, for example, a small bead 20 disposed on the edge of upper face 12, on one surface mating with a small indentation (not shown) on the complementing surface.

Disposed on the upper and lower faces 12 and 18, respectively, in matching relationship are interlocking means suitable to interlock the lower face of one container with the upper face of a second like container. As shown in FIGS. 1, 2 and 3, such means can take the form of a male component 21, (21a, 21b, 21c being analogous components on other depicted containers) integral with the face on which it is disposed, in this case upper face 12 (12a, 12b, 12c), and operable to interlock with a female component 22 disposed on the other face of a like container, in this case the lower surface of another container corresponding to 18.

As shown in FIG. 2, it is possible to assemble a plurality of containers in a modular relationship but still permit removal of any given cassette without destroying the modular system and without the need for a separate covering component. It is also apparent that the system can be modified by simply removing any one container, by disengaging the interlocking means and then reassembling the containers which were contiguous to the removed container in the overall system.

It is customary to provide cassette containers with a pair of internal pylons positioned so as to engage the two reel openings of any cassette stored therein. In the first embodiment of the present invention, shown in FIGS. 1, 2 and 3, female component 22 is disposed in pylon 23, thereby providing increased surface for retention for male component 21 without interfering with available space for storage of a cassette.

The path traced by the corner of a side wall such as 14 and 15 in the course of opening an individual container will extend beyond the plane of upper surface 12. In order to provide clearance to permit the opening of individual containers while at the same time maintaining the interlocking relationship, the intersection of upper surface 12 and side wall 13 is reduced to bevel 24 (or, alternatively, a rounded edge). At the same time, the opposite top corner of side walls 14 and 15, namely 25 and 26, respectively, is also beveled (or rounded). In both instances, the radius of rotation about shaft elements 16 and 16' will determine the degree of bevel or radius of curvature.

Depending upon the strength of the materials and designed dimensions, the interlocking means can be substantially permanent or can allow facile disengagement of one container from its contiguous container(s).

Figure 5:
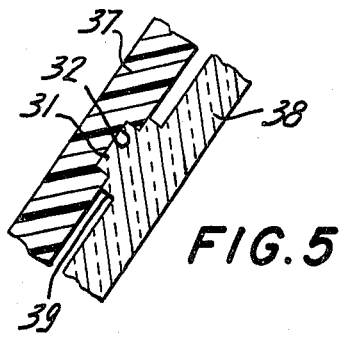
FIG. 5 is a cross-section of the interlocking means utilized in the embodiment of FIG. 4.
Figure 6:
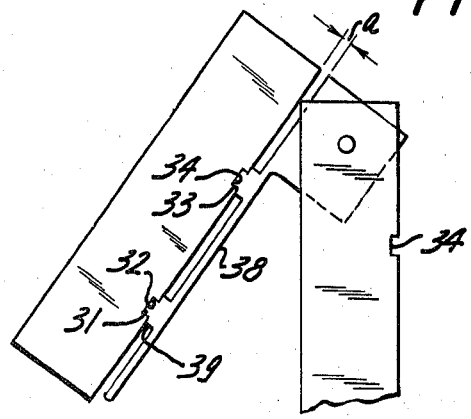
FIG. 6 is a side elevation of portions of two containers shown in interlocking relationship utilizing the embodiment of FIG. 4.

In the alternative embodiment shown in FIGS. 4, 5 and 6 there is provided elongated male connector 31 and groove 32 which components are dimensioned for slidable engagement. An additional male connection 33 and associated groove 34 can be provided in order to provide additional stability. As shown in FIG. 4, male connector 33 is interrupted in the region 35 in order not to engage the remainder of the lower face corresponding to 36 of another like cassette. Groove 34 similarly extends only across lower face 37 and engagement or disengagement can only be effected when upper face 38 is swung open, thereby providing a locking action against lateral movement when the containers are closed.

In this embodiment, the square corners of the conventional cassette are maintained; i.e. without the bevel 24 or rounded corners 25 and 26 shown in FIG. 1. Instead, there are provided spacer means 39, either associated with elongated male connectors 31 and 33, as shown, or associated with the face carrying grooves 32 and 34 (not shown). The heighth of spacer means 39, depicted as "a" in FIG. 6, is determined so as to provide clearance during rotation of the lid of one container with a second container attached thereto.

Figure 7:
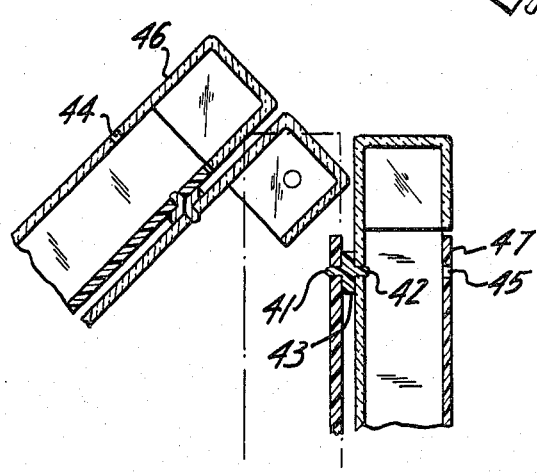
FIG. 7 is a cross-section of portions of several containers according to a third embodiment of the present invention.
Figure 8:
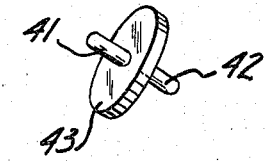
FIG. 8 is a perspective of the interlocking means utilized in the embodiment of FIG. 7.

As shown in FIGS. 7 and 8, it is also possible to utilize a separate interlocking and spacing component consisting of male components 41 and 42, integral with but extending from spacing element 43, which are inserted in corresponding openings 44 and 45 defined on upper surface 46 and lower surface 47, respectively. This embodiment provides a smooth surface for the cassette container i.e. without a male connector disposed thereon, when the cassettes are not interlocked.

Figure 9:
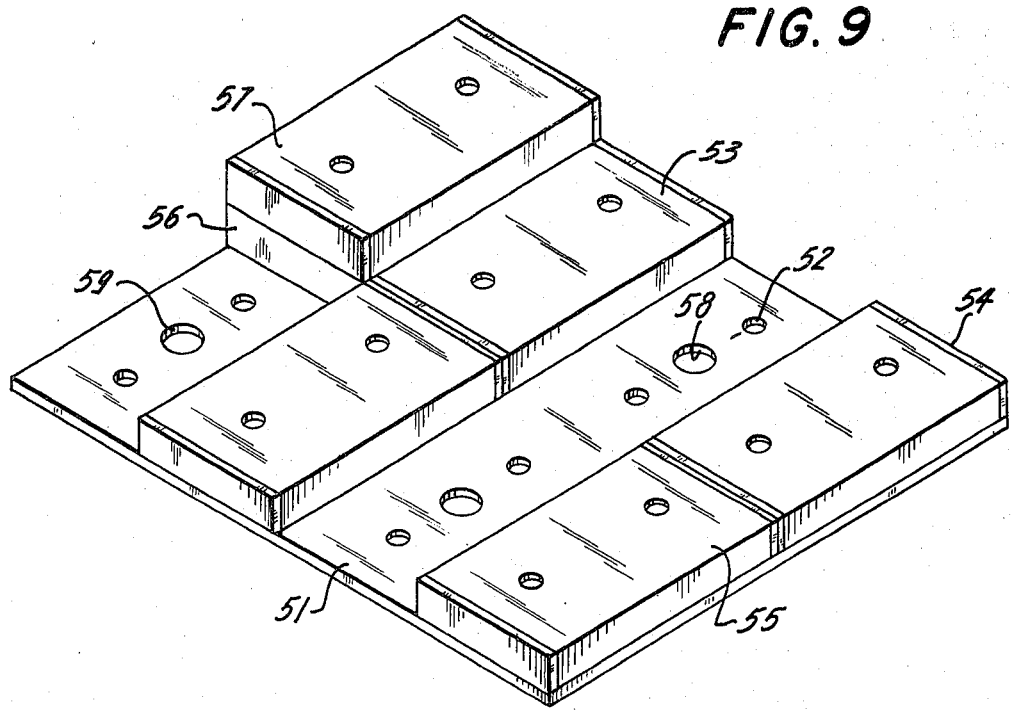
FIG. 9 is a perspective of a typical display arrangement utilizing the interlocking means for purposes of securing containers to a panel.

A further advantage of the present invention pertains to additional utilizations of the interlocking means. As shown in FIG. 9, for example, there may be a panel 51 having the appropriate complement 52 to the interlocking means on one side of the container, thereby permitting not only display of several containers 53, 54 and 55 in side by side array, but also some degree of stacking of containers 56 and 57 through utilization of that component of the interlocking means disposed on the exposed face of the container. It is possible to use a panel such as 51 to carry a plurality of cassette containers in fixed relationship but with a relatively small height, either for display or for transportation, as in an attache case. Suitable means such as punch holes 58 and 59 can be provided to facilitate removal of the containers.

Figure 10:
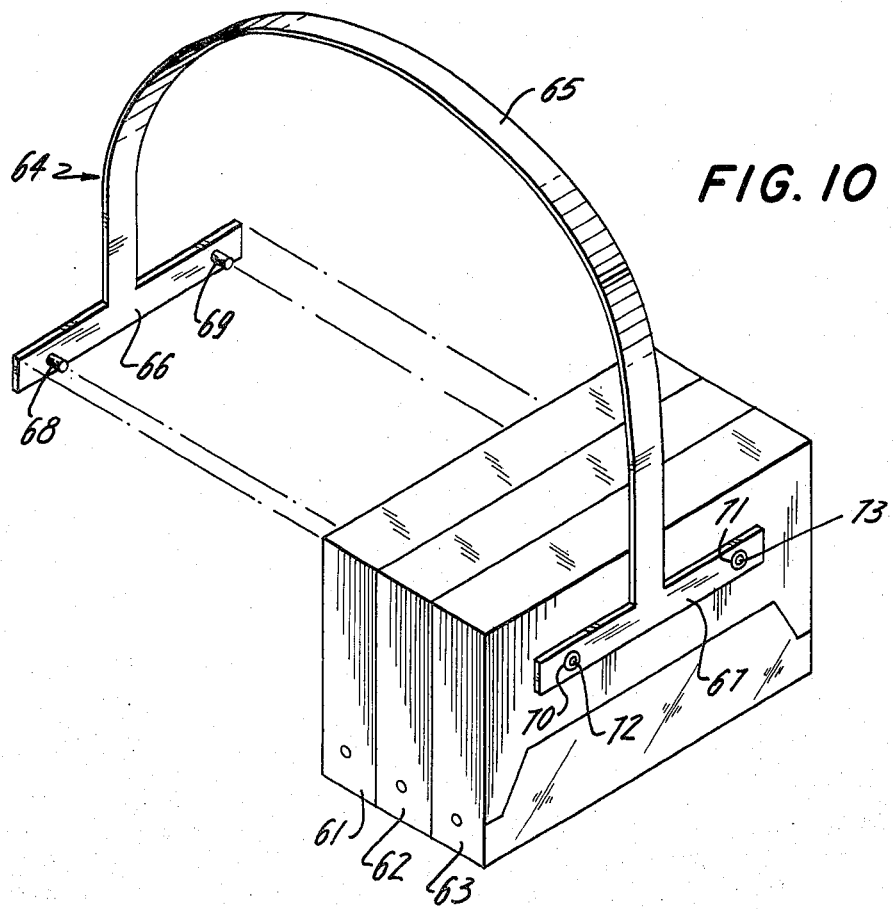
FIG. 10 is a perspective of a further aspect of the invention.

In FIG. 10 there is shown a plurality of cassette containers 61, 62 and 63 in interlocking relationship. The outermost containers in such a group will display the free components of the interlocking means. Handle 64 consists of a strap portion 65 and two engagement portions 66 and 67. One of these engagement portions 66 (shown disengaged) carries male components 68 and 69 operable to engage the free female components (not shown) of end container 61 while the other engagement portion 67 (shown engaged) carries female components 70 and 71 operable to engage the free male components 72 and 73 of end container 63. By use of such a handle, it is thus possible to carry a number of cassettes in their interlocked containers.

It is apparent from the foregoing that various modifications in the invention may be made without departing from the spirit of the invention, the invention being defined solely by the appended claims.

What is claimed is:

1. A plastic container of such dimensions as to receive a tape cassette having a pair of reel openings, said container having in its closed configuration an upper face, a two segment lower face, and two pairs of parallel side walls which faces and walls thereby define a rectangular parallelpipedal shape, one side wall of a first pair of side walls being integral with both the upper face and a first segment of said lower face so as to define a lid, the remaining single side wall of said first pair of walls being integral with the second segment of said lower face and with the second pair of side walls so as to define a body, said lid being pivotably mounted for opening between said second pair of side walls, detent means operable to favor retention of said container in its closed configuration, a pair of internal pylons disposed on the inner surface of said second segment of said bottom face for engagement of the reel openings of a tape cassette, and complementary interlocking means operable to interlock the lid-defining upper face of one container to the second segment of the bottom face of a second like container, said interlocking means being disposed in matching relationship on (a) said lid-defining upper face and (b) on said second segment of said bottom face in alignment with said pylons.

2. A plastic container according to claim 1 wherein one edge of the lid side wall is beveled or rounded sufficient to provide clearance for pivoting said lid when two containers are in interlocking relationship.

3. A plastic container according to claim 2 wherein the corner of each of the side walls of said second pair of side walls distal from said remaining single side wall and opposite said beveled or rounded edge is rounded to provide clearance for the corresponding second pair of side walls of a second container in interlocking relationship with said container.

4. A plastic container according to claim 1 including spacer means associated with said interlocking means and operable to maintain at least such clearance between said first and second containers to permit opening of said second containers while in interlocking relationship with said first container.

5. A plastic container according to claim 1 wherein said interlocking means comprises male components disposed on one face and mating female components disposed in matching relationship on the other face.

6. A plastic container according to claim 5 wherein said male components are integral with the lid defining upper face and the female components extend into said pylons.

7. A plastic container according to claim 1 wherein said interlocking means comprises an elongated male connector disposed across one of said faces and a groove operable to receive said connector disposed in matching relationship across the other face.

8. A strap for carrying a plurality of containers according to claim 1 in interlocking relationship including an elongated strap portion and a pair of engagemention portions disposed at either end of said strap portion, said engagement portion carrying complementary interlocking means operable to engage the free interlocking means components exposed on the end containers of said plurality.

9. A panel for conveying a plurality of containers according to claim 1, said panel having at least one carrying surface on which are disposed means operable to engage the components of said interlocking means disposed on one of said upper and lower faces of said containers.

* * * * *